US009436559B2

(12) United States Patent
Hayasaka et al.

(10) Patent No.: US 9,436,559 B2
(45) Date of Patent: Sep. 6, 2016

(54) STORAGE APPARATUS AND METHOD FOR CONTROLLING CACHE OF STORAGE APPARATUS

(71) Applicant: Hitachi, Ltd., Tokyo (JP)

(72) Inventors: Mitsuo Hayasaka, Tokyo (JP); Hitoshi Kamei, Tokyo (JP); Kazumasa Matsubara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/423,885

(22) PCT Filed: Jan. 17, 2014

(86) PCT No.: PCT/JP2014/050733
§ 371 (c)(1),
(2) Date: Feb. 25, 2015

(87) PCT Pub. No.: WO2015/107666
PCT Pub. Date: Jul. 23, 2015

(65) Prior Publication Data
US 2016/0034358 A1 Feb. 4, 2016

(51) Int. Cl.
G06F 12/16 (2006.01)
G06F 11/14 (2006.01)
G06F 12/08 (2016.01)
G06F 3/06 (2006.01)

(52) U.S. Cl.
CPC .......... G06F 11/1464 (2013.01); G06F 3/065 (2013.01); G06F 3/067 (2013.01); G06F 3/0619 (2013.01); G06F 11/1446 (2013.01); G06F 12/0802 (2013.01); G06F 12/0868 (2013.01); G06F 2201/84 (2013.01); G06F 2212/1032 (2013.01)

(58) Field of Classification Search
CPC ............. G06F 17/30067; G06F 11/1435; G06F 3/067; G06F 11/146; G06F 11/14566
USPC ................. 711/113, 161, 162; 707/639
See application file for complete search history.

(56) References Cited

U.S. PATENT DOCUMENTS

| 7,694,086 | B1 |   | 4/2010  | Bezbaruah et al. |
|-----------|----|---|---------|------------------|
| 7,734,591 | B1 | * | 6/2010  | Mercier .............. G06F 11/1466 707/639 |
| 7,975,115 | B2 | * | 7/2011  | Wayda ................. G06F 3/0608 707/638 |
| 8,572,337 | B1 | * | 10/2013 | Gokhale ............. G06F 11/1466 707/639 |
| 8,874,524 | B1 | * | 10/2014 | Zhao ................. G06F 17/30088 707/639 |

(Continued)

FOREIGN PATENT DOCUMENTS

JP 2006-277208 A 10/2006
WO 2012/164618 A1 12/2012

Primary Examiner — Ryan Bertram
Assistant Examiner — Edmund Kwong
(74) Attorney, Agent, or Firm — Volpe and Koenig, P.C.

(57) ABSTRACT

A storage apparatus is connected to a host apparatus and a secondary storage apparatus and includes a memory, a storage device, and a processor. The memory includes a save memory area and a cache memory area that temporarily stores data received from the host apparatus. The storage device stores data that is received from the host apparatus. The processor controls a duplication process for specified data to another storage apparatus at a point in time of a start of duplication, saves a first data block into the save memory area when receiving an update request of the first data block in the cache memory area after the start of duplication, and updates the first data block in the cache memory area to an updated data block.

13 Claims, 15 Drawing Sheets

(56) References Cited

U.S. PATENT DOCUMENTS

| | | | |
|---|---|---|---|
| 2006/0143412 A1* | 6/2006 | Armangau | G06F 3/0611 711/162 |
| 2006/0224639 A1 | 10/2006 | Watanabe et al. | |
| 2012/0124284 A1* | 5/2012 | Fuju | G06F 11/1466 711/113 |

* cited by examiner

Fig. 2

| | ACTION | FLAG | CHECKPOINT | CACHE MEMORY AREA | SAVE MEMORY AREA | PROCESS |
|---|---|---|---|---|---|---|
| TIME t0 | UPDATE REQUEST FOR b0 TO b0* | OFF | n | m*r, m*b, b0*, ma, a0, a1 | - | UPDATE b0 ON MAIN MEMORY TO b0*. ALSO UPDATE RELEVANT METADATA. |
| TIME t1 | START DUPLICATION PROCESS | ON | n | m*r, m*b, b0*, ma, a0, a1 | - | WRITE PIECES OF DATA m*r, m*b, AND b0* THAT ARE NOT REFLECTED ON DISK |
| TIME t2 | UPDATE REQUEST FOR a0 TO a0* | ON | n+1 | m**r, m*b, b0*, m*a, a0*, a1 | m*r, ma, a0 | SAVE PRE-UPDATE DATA |
| TIME t3 | UPDATE REQUEST FOR a1 TO a1* | ON | n+1 | m**r, m*b, b0*, m*a, a0*, a1* | m*r, ma, a0, a1 | SAVE PRE-UPDATE DATA a1 AND METADATA THEREOF |
| TIME t4 | WRITING UPDATED DATA | ON | n+1 | m**r, m*b, b0*, m*a, a0*, a1* | m*r, ma, a0, a1 | WRITE PIECES OF DATA m**r, m*a, a0*, AND a1* THAT ARE NOT REFLECTED ON DISK |
| TIME t5 | UPDATE REQUEST FOR a0* TO a0 | ON | n+2 | mr, m*b, b0*, ma, a0, a1* | m*r, ma, a0, a1 | UPDATE a0* TO a0** SINCE DUPLICATION TARGET a0 IS SAVED |
| TIME t6 | COMPLETE DUPLICATION PROCESS FOR a0 | ON | n+2 | m**r, m*b, b0*, ma, a0, a1* | m*r, ma, a1 | DELETE A ON SAVE MEMORY |
| TIME t7 | COMPLETE DUPLICATION PROCESS FOR a1 | ON | n+2 | m**r, m*b, b0*, m}*a, a0**, a1* | m*r | DELETE A ON SAVE MEMORY |
| TIME t8 | COMPLETE DUPLICATION PROCESS | OFF | n+2 | m**r, m*b, b0*, m}*a, a0**, a1* | - | DELETE METADATA ON SAVE MEMORY |
| TIME t9 | WRITING UPDATED DATA | OFF | n+2 | m**r, m*b, b0*, m}*a, a0**, a1* | - | WRITE PIECES OF DATA m**r, m*a, AND a0** THAT ARE NOT REFLECTED ON DISK |
| ⋮ | ⋮ | ⋮ | ⋮ | ⋮ | ⋮ | ⋮ |

Fig. 3
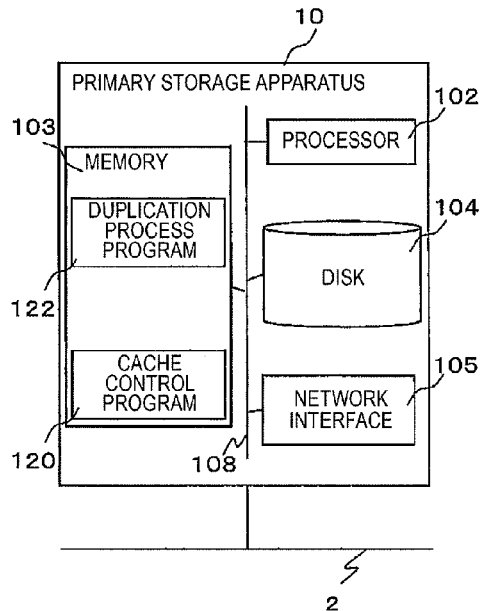
(a)
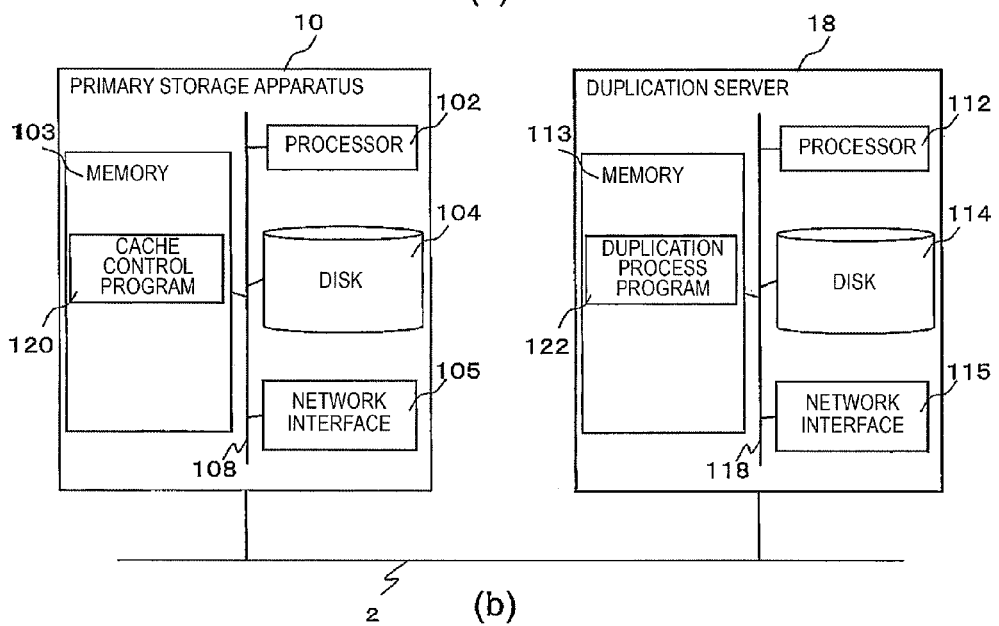
(b)

Fig. 4
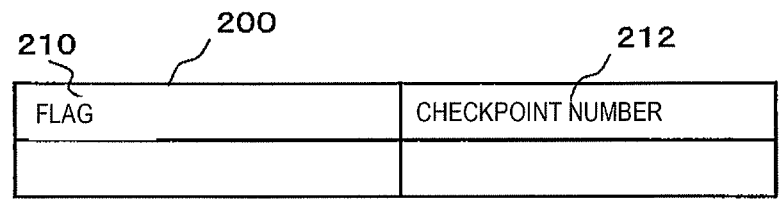
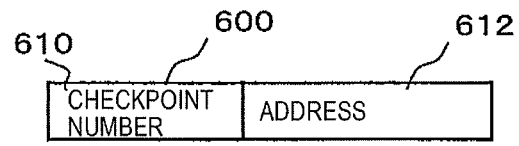
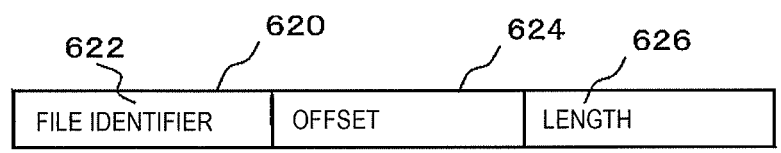
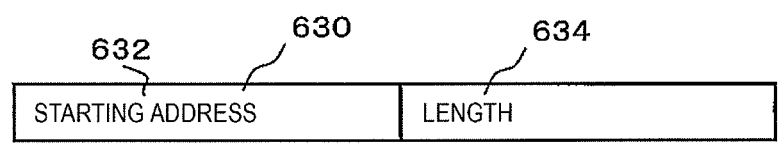

Fig. 12

(a) OFFSET REFERENCE MEMORY DESTINATION TABLE (BEFORE SAVE) _220_

| OFFSET | MEMORY ADDRESS |
|---|---|
| 00000 | aaaa |
| 00010 | bbbb |
| 00100 | cccc |
| 01000 | NULL |

_221_ _222_

(b) OFFSET REFERENCE MEMORY DESTINATION TABLE (AFTER SAVE) _220*_

| OFFSET | MEMORY ADDRESS |
|---|---|
| 00000 | aaaa |
| 00010 | dddd |
| 00100 | cccc |
| 01000 | NULL |

_221*_ _222*_

STORAGE APPARATUS AND METHOD FOR CONTROLLING CACHE OF STORAGE APPARATUS

TECHNICAL FIELD

The present invention relates to a method for controlling a cache of a storage apparatus.

BACKGROUND ART

Disaster in or failure of a storage apparatus causes loss of data stored in the storage apparatus and stops service. In order to recover data even if such loss of data occurs, backup is necessarily performed by duplicating data in another storage apparatus through remote copying.

In order to suppress loss of data to a minimum at the time of failure, the speed of processes is required to be as high as possible in performing such duplication of data. In addition, competition occurs between a data duplication request such as backup and an input-output request from a host apparatus to a storage apparatus, degrading both host I/O performance and backup performance.

A method for avoiding competition between input-output performance of host I/O and backup is disclosed in PTL 1. In a manner of creating a log according to a data update request from a host apparatus, an additional log that is different from a normal log is created on a disk in addition to creating a normal log on the disk. In the disclosure, the additional log is separated at the time of obtaining a backup while a log continues to be created as a normal log. The additional log separated is set to be read-only, and backup data is read from the additional log. This allows a backup process to be performed without competition between backup and host I/O to the normal log.

CITATION LIST

Patent Literature

[PTL 1] U.S. Pat. No. 7,694,086

SUMMARY OF INVENTION

Technical Problem

Two types of logs, the normal log and the additional log, are created on the disk in PTL 1. Thus, the load for the creation of logs is great. Furthermore, data is read from a cache memory when the data exists in the cache memory. However, since a log is recorded on the disk, data is read from the disk when the data does not exist in the cache memory. It is necessary to duplicate data at a checkpoint consistently in a data duplication technology such as backup. When the cache memory is overwritten because of an update request from the host that occurs during data duplication, data at a duplication target checkpoint is necessarily read from the additional log on the disk. That is, disk access frequently occurs along with the backup process, a load on the entire storage apparatus such as a CPU increases, and host I/O performance is degraded. However, creating the additional log on the cache memory so as to reduce disk access requires enormous memory capacity which is not realistic.

Therefore, an object of the present invention is to suggest a storage apparatus that performs a duplication process with degradation of host I/O performance reduced and a method therefor.

Solution to Problem

A storage apparatus is connected to a host apparatus and a secondary storage apparatus and includes a memory, a storage device, and a processor. The memory includes a save memory area and a cache memory area that temporarily stores data received from the host apparatus. The storage device stores data that is received from the host apparatus.

The processor controls a duplication process for specified data into another storage apparatus at a point in time at the start of duplication, saves a first data block into the save memory area when receiving an update request of the first data block in the cache memory area, and updates the first data block in the cache memory area to an updated data block after the start of duplication.

Advantageous Effects of Invention

According to the present invention, degradation of performance at the time of backup and deterioration of the efficiency of memory usage can be prevented.

BRIEF DESCRIPTION OF DRAWINGS

FIG. 2 is a schematic diagram provided for describing the process sequence of a cache generation managing process.

FIG. 3 illustrates a configuration diagram of a primary storage apparatus and a configuration diagram in a case of the primary storage apparatus and a duplication server being separated.

FIG. 4 is a diagram illustrating a table used in the embodiment.

FIG. 12 is a diagram illustrating an offset reference memory destination table in a second embodiment.

DESCRIPTION OF EMBODIMENTS

Figure 1:
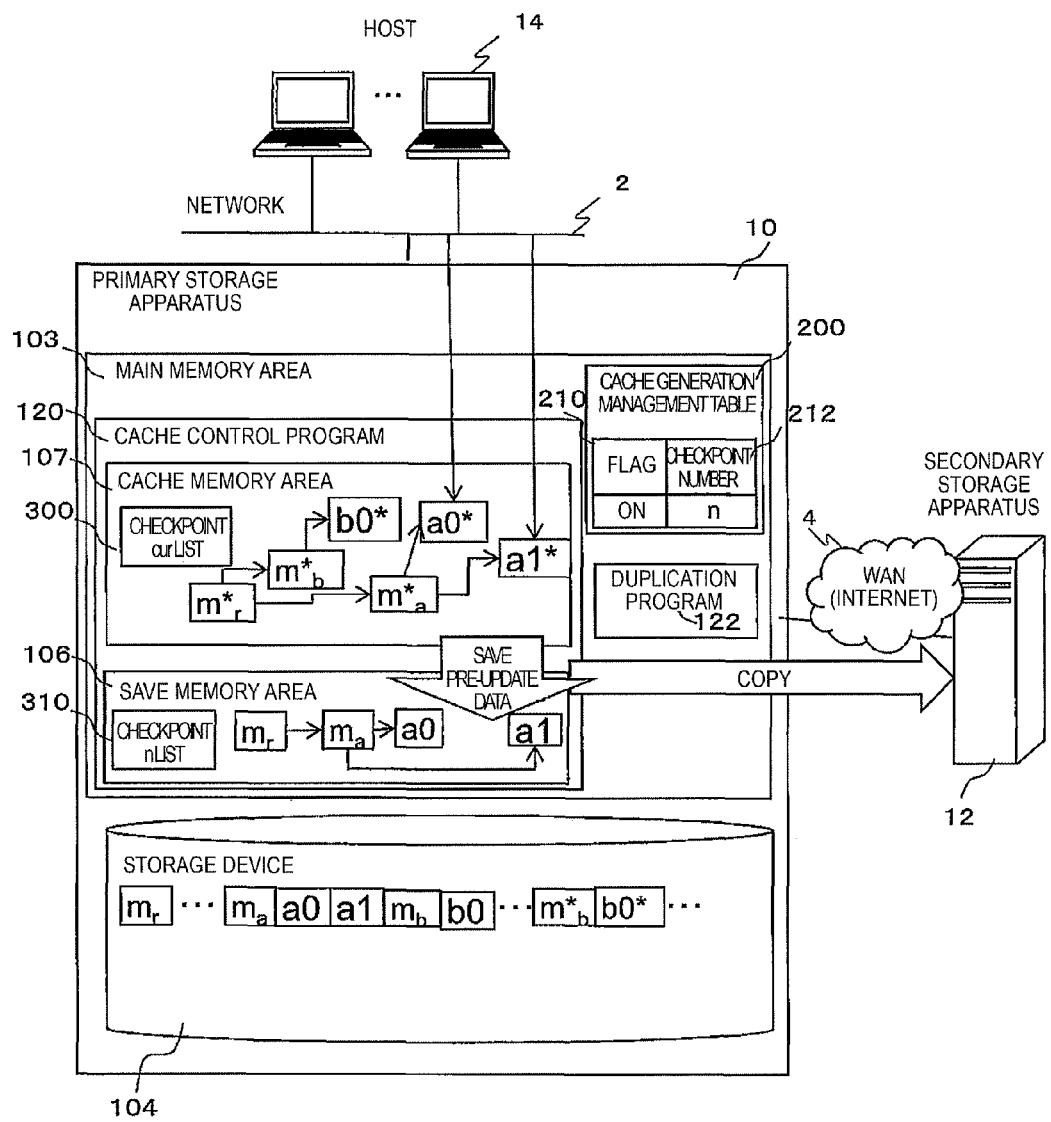
FIG. 1 is a diagram illustrating the outline of a first embodiment.

Several embodiments will be described with reference to the drawings. Embodiments described below do not limit the invention disclosed in the claims, and it cannot be said that all constituents and combinations thereof described in embodiments are essential for the solution of the invention.

Various pieces of information may be described as an expression "XX table" in the description below, but various pieces of information may be expressed as other data structures except a table. The "XX table" can be called "XX information" to indicate that various pieces of information are independent of a data structure.

There may be a case where a process is described with a program as a subject in the description below, but the subject of a process may be hardware because a determined process is performed while appropriately using storage resources (for example, a memory) and/or a communication interface (for example, a port) through executing a program by hardware or a processor (for example, microprocessor (MP)) that includes hardware. In addition, the source of a program may be, for example, a program distribution server or storage media.

A storage apparatus on which a file system that adopts a log-structured file system (LFS) is mounted is described as an example in the present embodiment, but not limited to the LFS, the present embodiment can also be applied to a storage apparatus or a block storage apparatus on which a file system that does not adopt the LFS is mounted.

First Embodiment

First, the LFS adopted in the present embodiment will be described. The LFS is a system that generates a snapshot of a file system automatically and continuously. In the LFS, when a file is updated, updated data is written into another block on a storage device without overwriting data in a block on the storage device that corresponds to a place where the file is updated. Accordingly, data at an arbitrary point in time in the past can be recovered. In addition, data in the block that corresponds to the place where the file is updated is overwritten at this time on a memory.

Data overwriting in the block in the memory along with the data update is performed during a duplication process. Thus, a data block of a duplication target on the memory at the point in time of the start of the duplication process may be updated and deleted from the memory during the duplication process. In the LFS in the related art, in such a case, data in the block of an update target that is deleted is accessed in the storage device and is read from the storage device. Reading data from the storage device takes time, and a load for reading is also great when compared with reading of data from the memory. This may have an influence on host I/O. However, adding updated data in a new memory area without performing an update on the memory as in the LFS increases the capacity of the memory used and decreases the efficiency of memory usage. This may have an influence on the host I/O.

In light of such a problem, in the present embodiment, only pre-update data which is a duplication target in a cache memory area is saved into a save memory area when a data update occurs during the duplication process. Accordingly, data of a duplication target can be obtained from the memory, and the duplication process can be performed with high speed. In addition, a load for the duplication process can be reduced, and the influence on the host I/O can also be reduced.

Next, the outline of the present embodiment will be described. FIG. 1 is a diagram illustrating the outline of the present embodiment. A primary storage apparatus 10 includes a main memory area 103 and a storage device 104 and is connected to a secondary storage apparatus 12 that holds a copy of data of the primary storage apparatus 10 and to a host apparatus 14 that transmits an I/O request. A cache generation management table 200, a checkpoint cur list 300, and a checkpoint n list 310 are managed in the main memory area 103. The cache generation management table 200 manages whether to perform generation management or not and a checkpoint of a generation management target. The checkpoint cur list 300 manages the most recent data in a cache memory area 107. The checkpoint n list 310 manages data that is related to a checkpoint number registered in the cache generation management table 200 in the memory, that is, data that is saved in a save memory area 106. The checkpoint here is a point in time when updated data in the cache memory area 107 is reflected on the storage device 104 and is managed with a checkpoint number that is a number incremented by one for each time updated data in the cache memory area 107 is reflected on the storage device 104. The checkpoint number that is given in a case where updated data is reflected on the storage device 104 when each of metadata and actual data is updated is managed for each block of data where the update occurs. The checkpoint at which the block of data is updated, that is, the generation of the block of data is identified by referring to the number of the given checkpoint.

The main memory area 103 stores programs such as a cache control program 120 and a duplication program 122 and also stores cache data such as pieces of metadata m*r, mr, mr, ma, m*a, mb, and m*b and pieces of actual data a0, a1, a0*, a1*, and b0*. The metadata here is management information for each content of a file, a directory, and the like and includes information on the size of the content, information that points to a place where the actual data which constitutes the content is stored on the storage device 104, and the like.

In FIG. 1, a0, a0*, a1, and a1* indicate blocks of data that constitute the actual data of a content a. "a" indicates a block of data of the content a, a number such as "0" and "1" is a number for distinguishing blocks of data that constitute the content, and "*" indicates post-update data. That is, a0 and a1 constitute different parts of the actual data of the content a, and a0 and a0* respectively indicate the pre-update data and the post-update data at the same part of the actual data of the content a. Next, ma and ma* are metadata of the content a, and mb and mb* are metadata of a content b. The metadata is updated along with an update of a data block and is saved together with a save of the data blocks a0 and a1. ma manages the pre-update data blocks a0 and a1, and ma* manages the post-update data blocks a0* and a1*. mr and m*r are root metadata of a file system and point to metadata of a plurality of contents included in the file system.

The pieces of metadata m*r, mr, mr, ma, m*a, mb, and m*b store the checkpoint number of the actual data that is located at a destination to which the metadata points. The main memory area 10 includes a cache area where the most recent data is stored and the save memory area 106 where pre-update data is saved and stored. Data at all checkpoints is stored on the storage device 104 without being overwritten on the storage device because data that is overwritten through a data update of the memory is stored in a new area allocated on the storage device at all times. For this reason, normally, data overwriting occurs in the memory.

When the duplication program 122 starts duplicating data at a checkpoint n, a flag in the cache generation management table 200 is set to ON, and a checkpoint number n at which duplication is performed is registered. The cache control program 120 creates the checkpoint list 310 that is a list of data blocks which constitute the metadata and the actual data of the duplication target content in the main memory area 10 at the checkpoint n when the flag is ON. Data registered at the checkpoint n obtains the checkpoint number of pre-overwriting data from the metadata when data in the checkpoint cur list 300 is updated and overwritten at the time of the flag being ON in the cache generation management table 200. In a case of a checkpoint number that occurs earlier than a checkpoint number 212 registered in the cache generation management table, pre-overwriting data is saved and registered in the checkpoint n list 310. The metadata that is modified because of data overwriting is also saved in the same manner. In a saving process, pre-update data in the memory may be copied to the save memory area 106. In addition, the saving process may be a process in which (1) pre-update data in the memory is excluded from the checkpoint cur list 300 and is linked to a new memory area secured in the cache memory, and (2) the linking of the pre-update data is changed to the checkpoint n list 310. Data at the checkpoint n is held in the memory by performing this process.

The duplication program 122 performs duplication of data at the checkpoint n by reading data saved in the checkpoint n list 310 and data registered in the checkpoint cur list 300. In addition, the duplication program 122 appropriately releases data for which the duplication process is completed, and the data saved in the checkpoint n list 310 is released. This improves the efficiency of memory usage.

According to the present embodiment, the above two processes can be performed with high speed when the consistent duplication process of data at the checkpoint n by the duplication program 122 overlaps an I/O request from the host apparatus. Furthermore, preparing an interface that performs a memory releasing process for data registered in the checkpoint n list 310 avoids retention of data in the memory.

Data protection through the duplication process of data stored in the storage is particularly necessary in providing cloud service or on-premises service. According to the present embodiment, the duplication process can be performed with high speed without interrupting the I/O request from the host apparatus.

FIG. 2 illustrates the process sequence of a cache generation managing process performed in the primary storage apparatus 10. A time t0 indicates a state where the primary storage apparatus 10 processes an update request of data b0 in the cache memory area 107 to b0* received from the host apparatus 14 when the flag in the cache generation management table 200 is OFF, that is, when the generation management is not performed. The data b0 on the cache area is updated and becomes b0*, and the relevant metadata mb and the metadata mr that manages each metadata are also updated. Since the flag is OFF, the pre-overwriting data b0 is not saved into the save memory area 106 even when data overwriting occurs in the cache memory area 107.

A time t1 is a time when the duplication process starts, a flag 210 in the cache generation management table 200 is set to ON by the duplication program 122, and n is registered at the checkpoint number 212. The cache control program 120 writes data in the memory that is not reflected on the disk onto the storage device 104. In addition, the cache control program 120 creates the checkpoint n list 310. Since the checkpoint number is incremented by reflecting non-reflected data on the storage device 104 when the next data update occurs, the most recent data at the point in time of the start of the duplication process can be confirmed as data at the checkpoint n.

A time t2 indicates a state where the primary storage apparatus 10 processes an update request of a0 on the memory to a0* during performing the generation management. Since data that is not reflected on the disk is written at the time t1, the checkpoint becomes n+1. m*r, ma, and a0 that are data at the checkpoint n are saved into the save memory area 106 and are registered in the checkpoint n list 310. In the cache memory area 107, the data a0 is updated and becomes a0*, and the relevant metadata ma and the metadata m*r that manages each metadata are also updated respectively to m*a and m**r. Accordingly, the checkpoint n is held in the save memory area 106, and reading for the duplication process is performed with a small load and high speed from the main memory area 103, not from the storage device 104.

A time t3 indicates a state where the primary storage apparatus 10 processes an update request of a1 in the cache memory area 107 to a1*. The data a1 at the checkpoint n is saved into the save memory area 106 and is registered in the checkpoint n list 310. In the cache memory area 107, the data a1 is updated and becomes a1*, and a part of the relevant metadata m*a that is related to a1* is overwritten and updated.

Data that is not reflected on the disk is written into the storage device at a time t4.

A time t5 indicates a state where the primary storage apparatus 10 processes an update request of a0* on the memory to a0**. The checkpoint becomes n+2. At this time, since the data a0 at the checkpoint n is previously saved, a0* is not saved into the save memory area 106, the data a0* in the cache memory area 107 is updated and becomes a0**, and a part of the relevant metadata m*a that is related to a0** is overwritten and updated. Consumption of the memory 103 can be suppressed by not saving updated data subsequent to the checkpoint n into the save memory area 106.

A time t6 indicates a status in which the duplication program 122 completes the duplication process for a0. The data block a0 linked to the checkpoint n list 310 in the save memory area is released through the memory releasing process performed by the duplication program 122. That is, another data block can be stored in a block where the data block a0 is stored in the save memory area 106. Accordingly, releasing a data block for which the duplication process is completed from a block where the data block is stored in the save memory area 106 in order without waiting for the completion of the entire duplication process can prevent the capacity of the save memory area 106 from being under pressure.

A time t7 indicates a status in which the duplication program 122 completes the duplication process for a1. Since duplication of a data block, among data blocks of the content a, that is saved into the save memory area 106 is completed, the cache control program 120 releases the data a1 linked to the checkpoint n list 310 in the save memory area and the metadata ma as well through the memory releasing process performed by the duplication program 122.

A time t8 indicates a status in which the duplication process is completed for other pieces of data including the data b0* and the like at the checkpoint n. The flag 210 in the cache generation management table 200 is set to OFF, and the registered checkpoint number 212 is deleted. Furthermore, the entire data in the save memory is deleted, and the checkpoint n list 310 is also deleted.

A time t9 indicates a status in which updated data in the memory is written after the completion of the duplication process.

I/O requests from the duplication process and the host apparatus can be processed with high speed, and degradation of the efficiency of memory usage can be suppressed by repeating such processes at the time of the duplication process that is performed periodically or aperiodically.

FIG. 3-(a) illustrates the system configuration of the primary storage apparatus 10 according to the present embodiment. The primary storage apparatus 10 is mainly configured by a processor 102, the memory 103, the disk 104, and a network interface 105. These constituents are connected to each other through a system bus 108. A network 4, for example, may be a wide area network (WAN), a local area network (LAN), the Internet, a public network, a private network, or the like.

The processor 102 functions as an operation processing device and controls operation of the cache control program 120 and the duplication process program 122 according to programs, operation parameters, or the like stored in the memory 103.

The memory 103 corresponds to the main memory area 103 in FIG. 1 and stores the cache control program 120 and the duplication process program 122. Besides being used for storing various pieces of information read from the disk 104, the memory 103 is used as a cache memory that temporarily stores data received from the host apparatus 14 or is used as a work memory for the processor 102. Volatile memories such as a DRAM or non-volatile memories such as a flash memory are used in the memory 103, and reading and writing of data can be performed from the memory 103 with higher speed than from the disk 104.

The cache control program 120 determines which data is to be saved and performs the saving process and a releasing process for the data. The duplication process program 122 transmits data at a checkpoint to the secondary storage apparatus 12 through the network interface 105 in cooperation with the cache control program 120. In addition, the duplication process program 122 performs the releasing process for transmitted data.

Here, as described in FIG. 1, the memory 103 includes the cache memory area 107 that temporarily stores data received from the host apparatus 14 and the save memory area 106 that stores data saved from the cache memory area 107. The cache memory area 107 and the save memory area 106 may be physically separated, or each block of the cache may be managed with an attribute that indicates the area in which the block is included. In addition to copying data from the cache memory area 107 to the save memory area 106, saving of data from the cache memory area 107 to the save memory area 106 may be performed by changing the attribute of a block where the saving target data is stored from the cache memory area 107 to the save memory area 106.

The disk 104 corresponds to the storage device 104 in FIG. 1 and stores various pieces of software and management information, data including the metadata and the actual data, and the like.

FIG. 3-(b) illustrates an example of a configuration in a case where the duplication process program 122 is running on another server 12. FIG. 3-(b) is the same as FIG. 3-(a) except that the duplication process program 122 accesses the primary storage apparatus 10 through the network interface 115 and duplicates data of the primary storage apparatus 10 at a checkpoint to the secondary storage apparatus 12.

FIG. 4 illustrates the table structure of the cache generation management table 200, the data structure of data 600 added to the metadata, and memory release interfaces 620 and 630 that are used in the present embodiment.

The cache generation management table 200 is configured by the flag 210 for determining whether to perform the cache generation management and the checkpoint number 212 for registering the checkpoint number of a cache generation management target. The flag 210 is set to "ON" when the duplication process starts, and the checkpoint number of a checkpoint at the timing of the start of the duplication process is registered at the checkpoint number 212. When an update request occurs for the block of data of the metadata or the actual data that is given a number smaller than or equal to that of the checkpoint n in the cache memory area 107 at the time of the flag 210 being "ON", the block of data of the pre-update metadata or the actual pre-update data is saved into the save memory area 104. When an update request occurs for the block of data of the metadata or the actual data in the cache memory area 107 at the time of the flag 210 being "OFF", the data in the cache memory area 107 is overwritten and is not saved into the save memory area 104.

The additional data 600 is information added to the metadata that is the management information for each content. Here, since the metadata is used in a file system in the related art, description of the metadata will be omitted, and only the information added to the metadata will be described in the present embodiment. The additional data 600 is configured by a checkpoint number 610 of a point in time at which each block of data is reflected on the disk 104 and an address 612 at which the block of data is stored. The address, for example, may be an address for data arrangement on the disk 104 or may be an address for data arrangement in the memory 103. Data on the disk 104 or in the memory 103 can be accessed by referring to the address.

The memory release interface 1 620 is an interface for releasing an area where data for which the duplication process is completed is stored in the save memory area 106. The memory release interface 1 620 is configured by a content identifier 622 that indicates which content is released, an offset 624 inside the content, and a length 626 that is the length of the data from the offset. Accordingly, instructions can be made for the releasing process for data that corresponds to the offset and the length of the content in the save memory area 106.

A memory release interface 2 630 is a modification example of the memory release interface 1 620 and is an interface for releasing an area where data for which the duplication process is completed is stored in the save memory area 106. Unlike the memory release interface 1 620, the memory release interface 2 630 directly specifies an address in the save memory area. The memory release interface 2 630 is configured by a starting address 632 that is the starting address of an area for which the releasing process is performed and a length 634 that indicates the length of data from the starting address. Similarly, instructions can be made for the releasing process for data that is specified by the memory release interface 2 630 in the save memory area.

The checkpoint cur list 300 is a list for managing the most recent data, and the checkpoint n list 310 is a list for managing data that is saved for the generation management. These checkpoint lists, for example, are configured by a unidirectional list, a bidirectional list, a radix-tree, a red-black tree, a B-tree, a B+tree, and the like, and a search key is configured by an LBA, a sector number, a combination of a file and an offset, an index value and a hash value derived from these, and the like.

Figure 5:
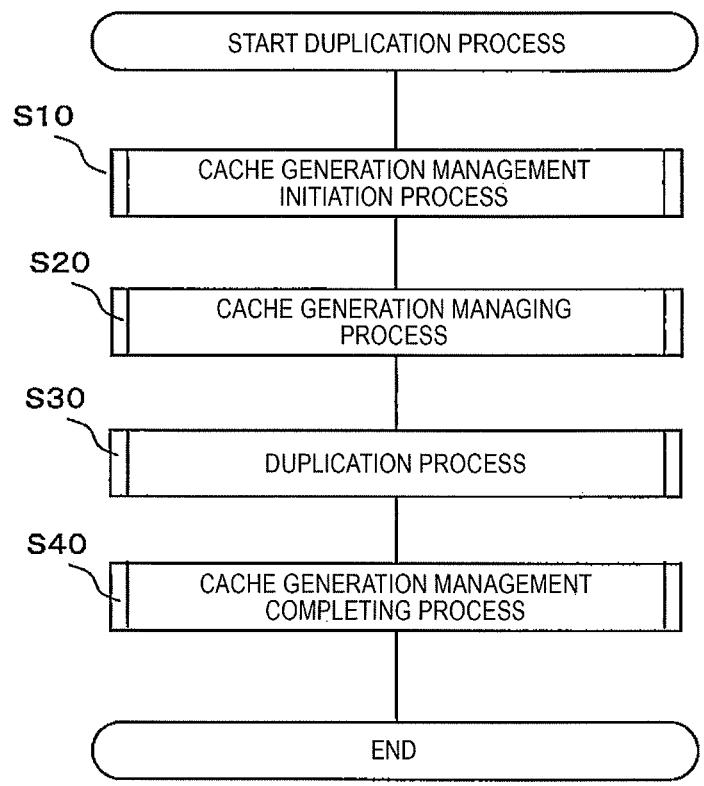
FIG. 5 is a flowchart of all processes in the embodiment.

FIG. 5 is a flowchart illustrating the entire process procedure of the duplication process in the present embodiment. When the duplication process program 122 receives an instruction to start the duplication process from a user, or an automatic starting time of the duplication process comes, the duplication process program 122 performs a cache generation management initiation process and instructs the cache generation management program 120 to perform the cache generation management initiation process, and the cache generation management program 120 performs the cache generation management initiation process (S10). Next, the cache control program 120 performs the cache generation managing process (S20), and the duplication process program 122 performs the duplication process in cooperation with the cache control program 120 (S30). Here, the cache generation managing process (S20) and the duplication process (S30) are performed in a parallel manner. Thereafter, when the duplication process is completed, the duplication program 122 instructs the cache generation management program 120 to perform a cache generation management completing process, and the cache generation management program 120 performing the cache generation management completing process (S40) ends all the processes of the duplication process. Each procedure will be described in detail further below.

Figure 6:
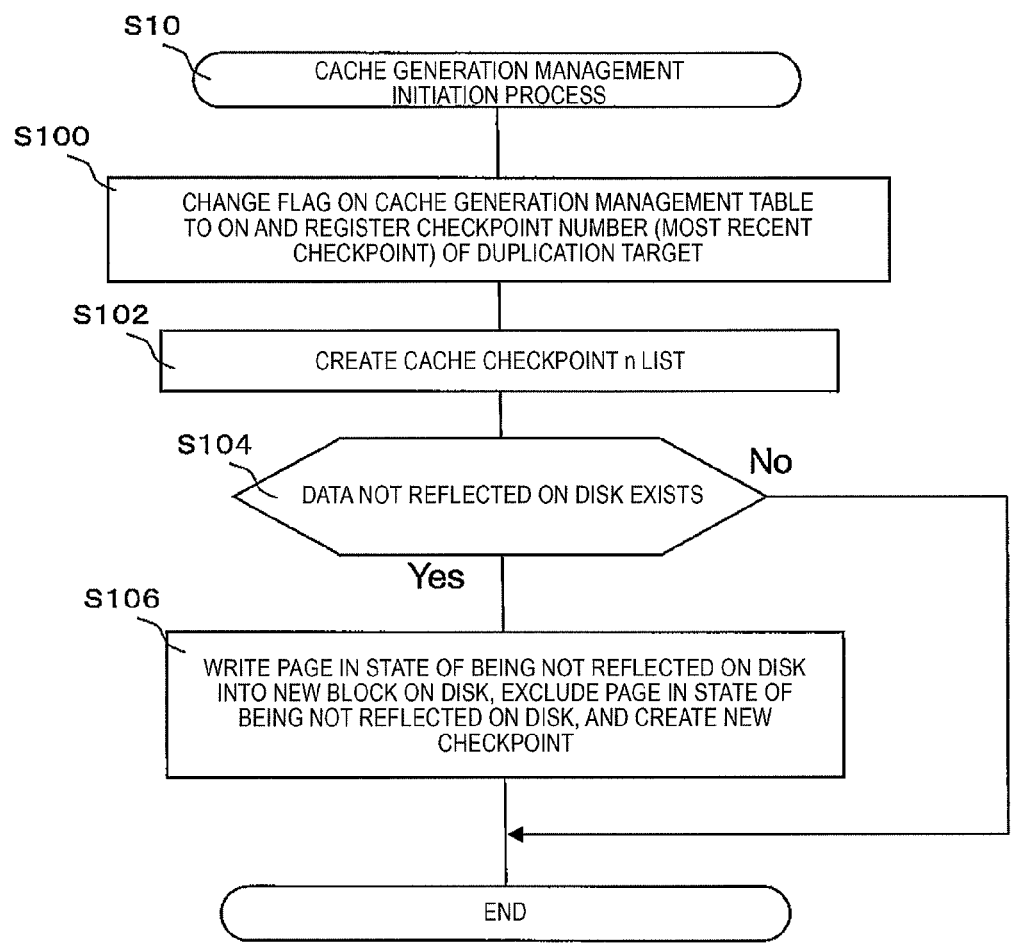
FIG. 6 is a flowchart of a cache generation management initiation process.

FIG. 6 is a flowchart illustrating the process procedure of the cache generation management initiation process in S10 in FIG. 5. When the cache generation management initiation process starts, the duplication process program 122 specifies the most recent checkpoint as a checkpoint for which the generation management is performed and mounts the checkpoint to set the flag 210 to ON in the cache generation management table 200 and to register the checkpoint number for which the generation management is performed at the checkpoint number 212 (S100). The cache control program 120 creates the checkpoint management list 310 to save data (S102). In S104, determination of whether data that is not reflected on the disk 104 exists in the cache memory area 107 is performed. When non-reflected data exists (YES in S104), S106 is performed. In S106, a block of data and the metadata in a state of being not reflected on the disk are written into a new area on the disk 104. The block of data and the metadata are excluded from the management of the state of being not reflected on the disk in the cache memory, a new checkpoint is created when reflecting is performed on the disk 104, and the process ends. After the reflecting process is performed on the disk 104 (S106) or when non-reflected data does not exist (NO in S104), the cache generation management initiation process ends. Performing the cache generation management initiation process can confirm a checkpoint that is the point in time of the start of the duplication process and can save data at the checkpoint into the save memory area 106 in the memory 103 with respect to the subsequent updates.

Figure 7:
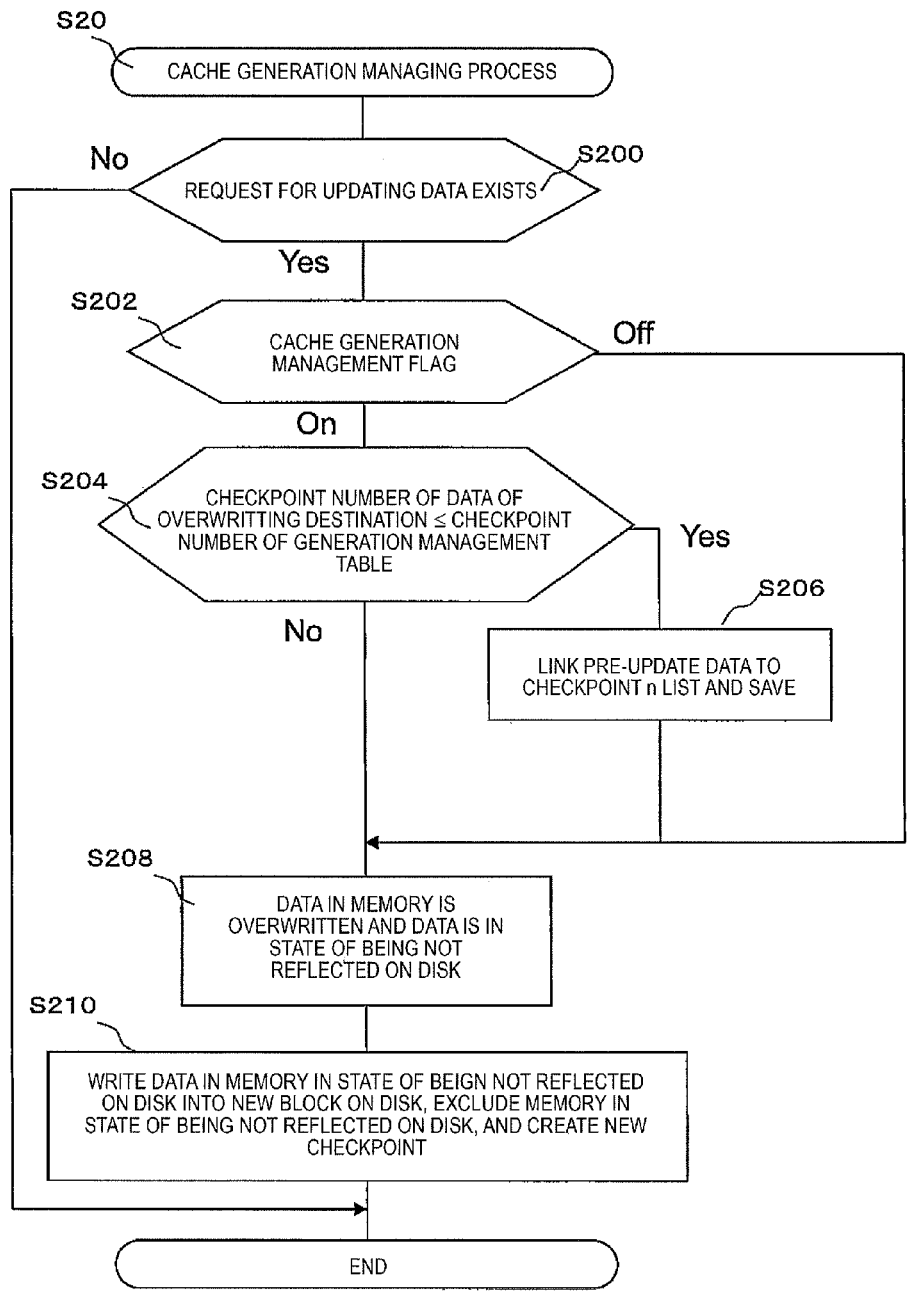
FIG. 7 is a flowchart of the cache generation managing process.

FIG. 7 is a flowchart illustrating the process procedure of the cache generation managing process in S20 in FIG. 5. The cache generation managing process is also performed when the duplication process is not performed (when the flag 210 in the cache generation management table 200 is "OFF"). When the cache generation managing process starts, the cache control program 120 monitors whether a data update request from the host apparatus 14 exists (S200). When a data update request does not exist (NO in S200), the cache generation managing process ends. When a date update request exists (YES in S200), S202 is performed. The cache control program 120 determines whether the flag 210 in the cache generation management table 200 is ON or OFF (S202). When the flag 210 is OFF (OFF in S202), S208 is performed. When the flag 210 is ON (ON in S202), the additional information 600 of the metadata of the content regarding the update request is referred to, the checkpoint number 610 added to the data block of the update target is referred to, and determination of whether the checkpoint number 610 that is referred to is smaller than or equal to the number registered at the checkpoint number 212 in the cache generation management table 200 is performed (S204).

When the checkpoint number 610 is smaller than or equal to the number registered at the checkpoint number 212 (NO in S204), that is, when the checkpoint number 610 of the data block of the overwriting destination is greater than or equal to n+1 given that the number registered at the checkpoint number 212 is n, S208 is performed. That is, an overwriting process is performed in S208 without saving the data block of the overwriting destination. When the checkpoint number 610 is smaller than or equal to the number registered at the checkpoint number 212 (YES in S204), that is, when the checkpoint number 610 of the data block of the overwriting destination is smaller than or equal to n given that the number registered at the checkpoint number 212 is n, an area is secured in the save memory area 106, the pre-update data block and the pre-update metadata are copied and linked to the checkpoint n list 310, and the data at the checkpoint registered in the cache generation management table 200 is saved into the save memory area 106 (S206). In S206, excluding the pre-update data from the checkpoint cur list 300 and changing the linking of the pre-update data to the checkpoint n list may be performed alone. According to the above process, S206 is performed only once for a piece of data at a checkpoint. In other words, a data block (metadata) of the content of a duplication target at the checkpoint n exists in the cache memory area 107 at the start of duplication and the data block is given a checkpoint number smaller than or equal to n. Only the data block is saved into the save memory area 106, and data blocks updated subsequent to the checkpoint n are not saved into the save memory area 106.

In S208, the cache control program 120 overwrites the data block in the cache memory area 107 and updates the metadata. The data in the cache memory area 107 is in the state of being not reflected on the disk. In S210, the data in the state of being not reflected on the disk on the memory is written into a new area on the disk 104, the management of the state of the data not being reflected on the disk in the cache memory area 107 is excluded, and a new checkpoint is created, that is, the checkpoint number is incremented by one. Then, the process ends. According to the above process, a data block of a duplication target for which the duplication process is not completed can be held in the memory 103 and is not moved from the memory 103. Accordingly, reading and writing in the duplication process can be performed with high speed. In addition, since saving is performed only for a data block of a duplication target, pressure on the capacity of the memory 103 can be suppressed.

Figure 8:
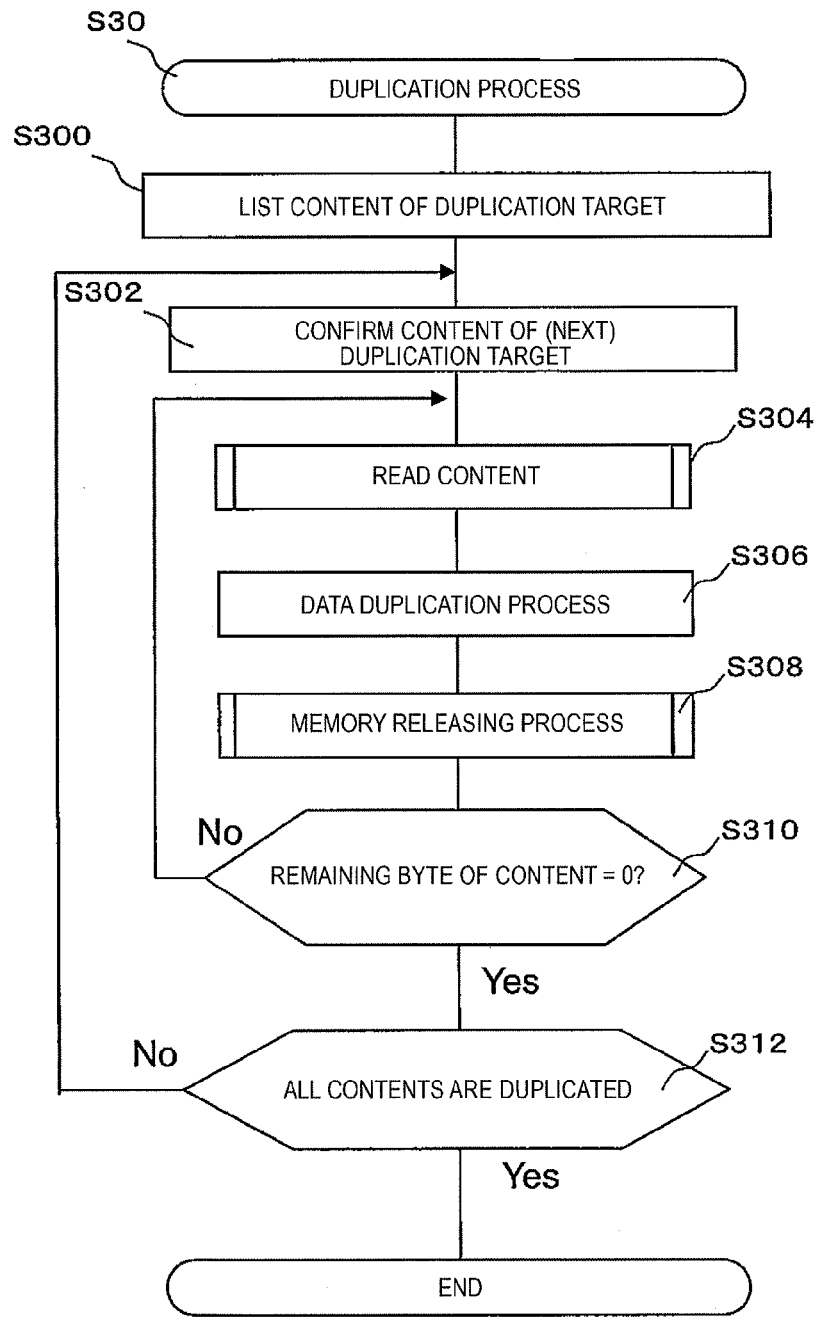
FIG. 8 is a flowchart of a duplication process.

FIG. 8 is a flowchart illustrating the process procedure of the duplication process in S30 in FIG. 5. The duplication process program 122 lists the content of a duplication target (S300). Confirmation of the content of a duplication target is performed from the listed content (S302), and the content confirmed is read (S304). The duplication process program performs the data duplication process through which the content read is transmitted to the secondary storage apparatus 12 (S306) and performs the memory releasing process for data for which duplication is completed (S308). S304 to S308 are repeated until duplication of the content confirmed as a duplication target is completed (S310). Next, determination of whether duplication of all the listed content of a duplication target is completed is performed (S312). When duplication of all the content does not end (NO in S312), the process returns to S302, and S302 to S310 are repeated until duplication of all the content is completed. When duplication of all the content is completed (YES in S312), the duplication process ends. The process procedure of the cache control program 120 in S304 and S308 is illustrated in FIG. 9 and FIG. 10.

Figure 9:
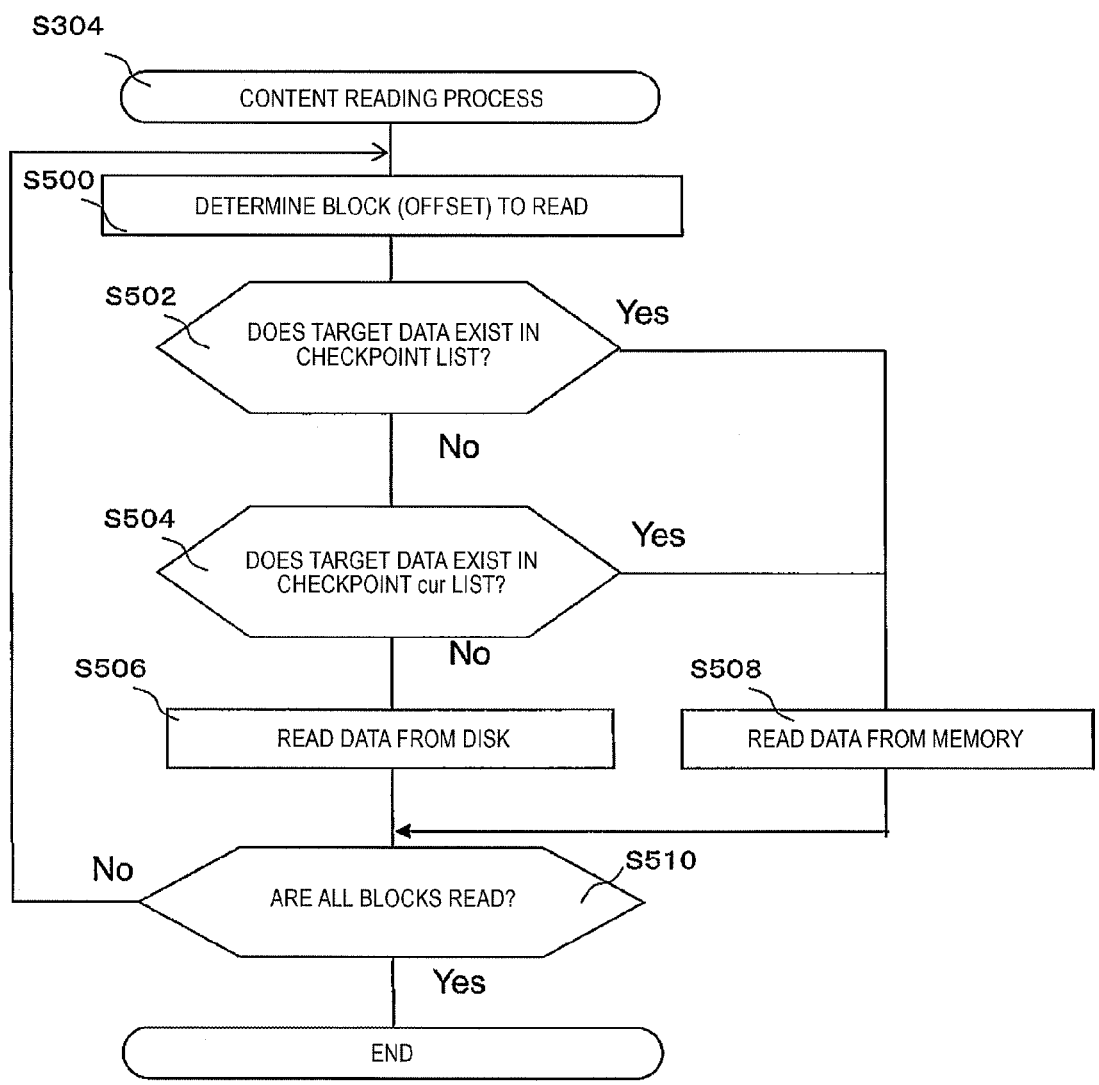
FIG. 9 is a flowchart of a content reading process.

FIG. 9 is a flowchart illustrating the process procedure of a content reading process in S304 in FIG. 8. The duplication process program 122 determines a block (offset) that stores a data block of the content of a duplication target to read (S500). The cache control program 120 determines whether the data block determined exists in the checkpoint list 310, that is, whether the data block determined exists in the save memory area 106 (S502). When the data block exists (YES in S502), the data in the save memory area 106 is read (S508). When the data block does not exist (NO in S502), determination of whether the data block exists in the most recent checkpoint cur list 300, that is, determination of whether the data block exists in the cache memory area 107 is performed (S504). When the data block exists (YES in S504), the data block is read from the cache memory area 107 (S508). When the data block does not exist (NO in S504), the data block is read from the disk 104 since the data block does not exist in either the save memory area 106 or the cache memory area 107. Next, determination of whether all the data blocks of the content of a duplication target are read is performed (S510). When reading is not completed (NO in S500), the process returns to S500. When reading is completed (YES in S500), the process ends. As described above, the checkpoint list 310 is used in determining whether a data block of a reading target exists in the save memory area 106, and the data block of a reading target is read from the cache memory area 107 when the data block of a reading target does not exist in the save memory area 106. Thus, determining which one of the cache memory area 107 and the save memory area 106 stores a data block that constitutes the content at the checkpoint n is possible, and the data block of a target can be read from the memory 103.

Figure 10:
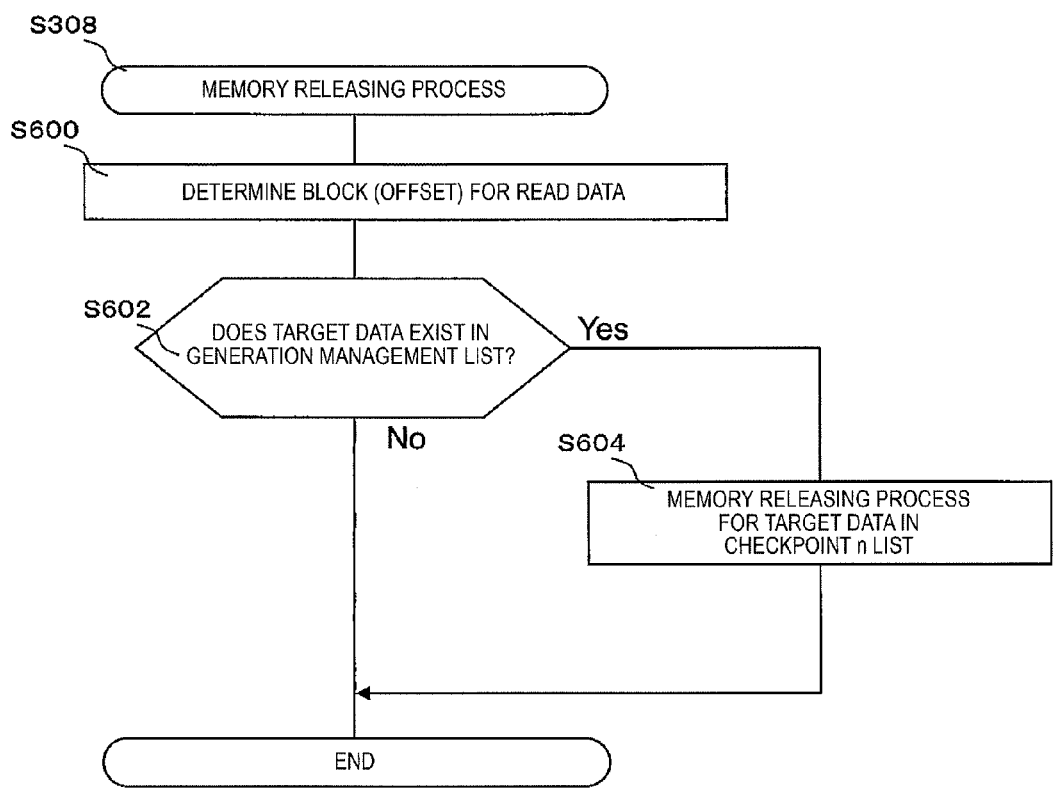
FIG. 10 is a flowchart of a memory releasing process.

FIG. 10 is a flowchart illustrating the process procedure of the memory releasing process in S308 in FIG. 8. The duplication process program 122 transmits a data block to the secondary storage apparatus 12 and specifies duplicated data by using the memory release interface 1 620 or the memory release interface 2 630 regarding data for which the duplication process is completed, and the cache control program 120 determines a block (offset) that stores the duplicated data (S600). The cache control program 120 determines whether the data exists in a data block specified in the checkpoint list 310 (S602). When the data exists (YES in S602), that is, when the data block specified exists in the save memory area 106, the memory releasing process is performed for the specified data block in the save memory area 106 (S604). When the data does not exist (NO in S602), the process ends. According to the above process, a memory area for which duplication ends in the save memory area 106 can be released in order of the end of duplication, and pressure on the capacity of the memory 103 can be suppressed.

Figure 11:
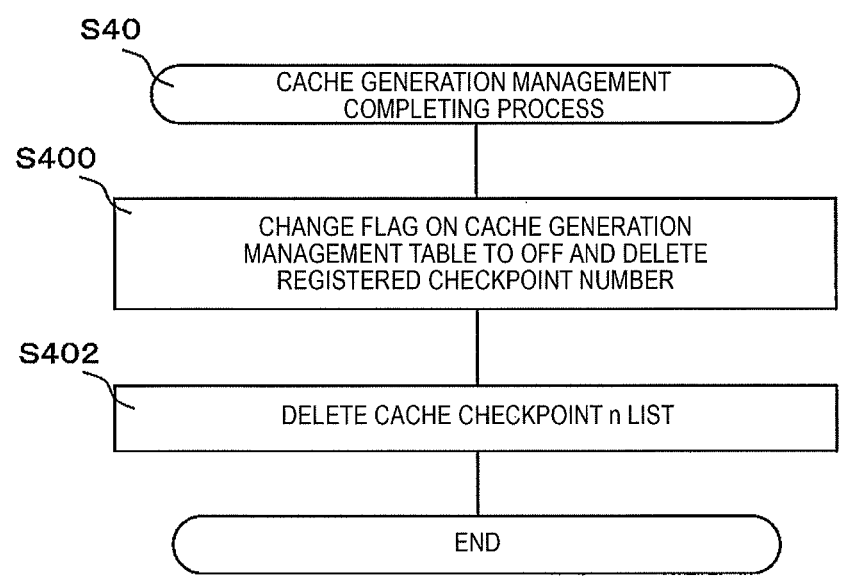
FIG. 11 is a flowchart of a cache generation management completing process.

FIG. 11 is a flowchart illustrating the process procedure of the cache generation management completing process in S40 in FIG. 8. The duplication process program 122, for example, performs an unmounting process when the duplication process ends to perform the cache generation management completing process. At this time, the flag 210 in the cache generation management table 200 is set to OFF, and the registered checkpoint number 212 is deleted (S400). The cache control program 120 deletes the checkpoint list 310 (S402), and the process ends. According to the above process, the process of saving a data block at a checkpoint into the save memory area 106 ends.

Second Embodiment

Normally, a file system manages an offset reference memory destination table 220 for each content to manage the memory in which an offset of the content exists. In the present embodiment, a method for referring to saved data efficiently by correcting a memory reference destination in the table will be described. In the present method, reference of data on the cache memory and the data in the save memory is realized by duplicating and keeping the table in the save memory side and referring to the corrected memory reference destination in the table.

Since the configuration and the process procedure of the present embodiment are mostly the same as those of the first embodiment, the procedure of a cache generation managing process, a content reading process, and a memory releasing process that is different from that in the first embodiment will be mainly described.

FIG. 12 illustrates an offset reference memory destination table 220 in the second embodiment. The offset reference memory destination table 220 is stored in the main memory area 103 for each content and is used for managing the place at which the offset exists in the memory. FIG. 12(*a*) illustrates the state of the offset reference memory destination table 220 before a save occurs, that is, a state where any of data blocks that constitute the content (assume the content is a content A) managed in the offset reference memory destination table 220 is not saved into the save memory area 106. An offset 221 stores an offset that is divided by a unit of memory management for the content A. A memory address 222 indicates the place where data indicated by the offset is stored on the memory 103. In the offset reference memory destination table 220 before being saved, the memory address 222 stores an address in the cache memory area 107. When the data indicated by the offset does not exist in the memory 103, "NULL" is stored in the memory address 222, and the data is read from the disk 104 after a new area is allocated in the memory 103. FIG. 12(*b*) illustrates an offset reference memory destination table 220\* after being saved. The offset reference memory destination table 220 is saved into the save memory area 106 at the timing of initial saving of a data block that constitutes the content. FIG. 12(*b*) illustrates a state after a data block that corresponds to the offset "00010" of the content A is updated, a new memory area "dddd" is allocated, and the updated data is stored in the new memory area. At this time, the pre-update data "bbbb" that exists in the memory is data that is referred to only from the offset reference memory destination table 220 which is saved. The reference destination memory of the memory address 222\* of the offsets "00000" and "00100" where data is not updated does not change. Data after a save is read by referring to the saved reference memory destination table 220. Thus, the data of the content A at the checkpoint n can be easily read.

Figure 13:
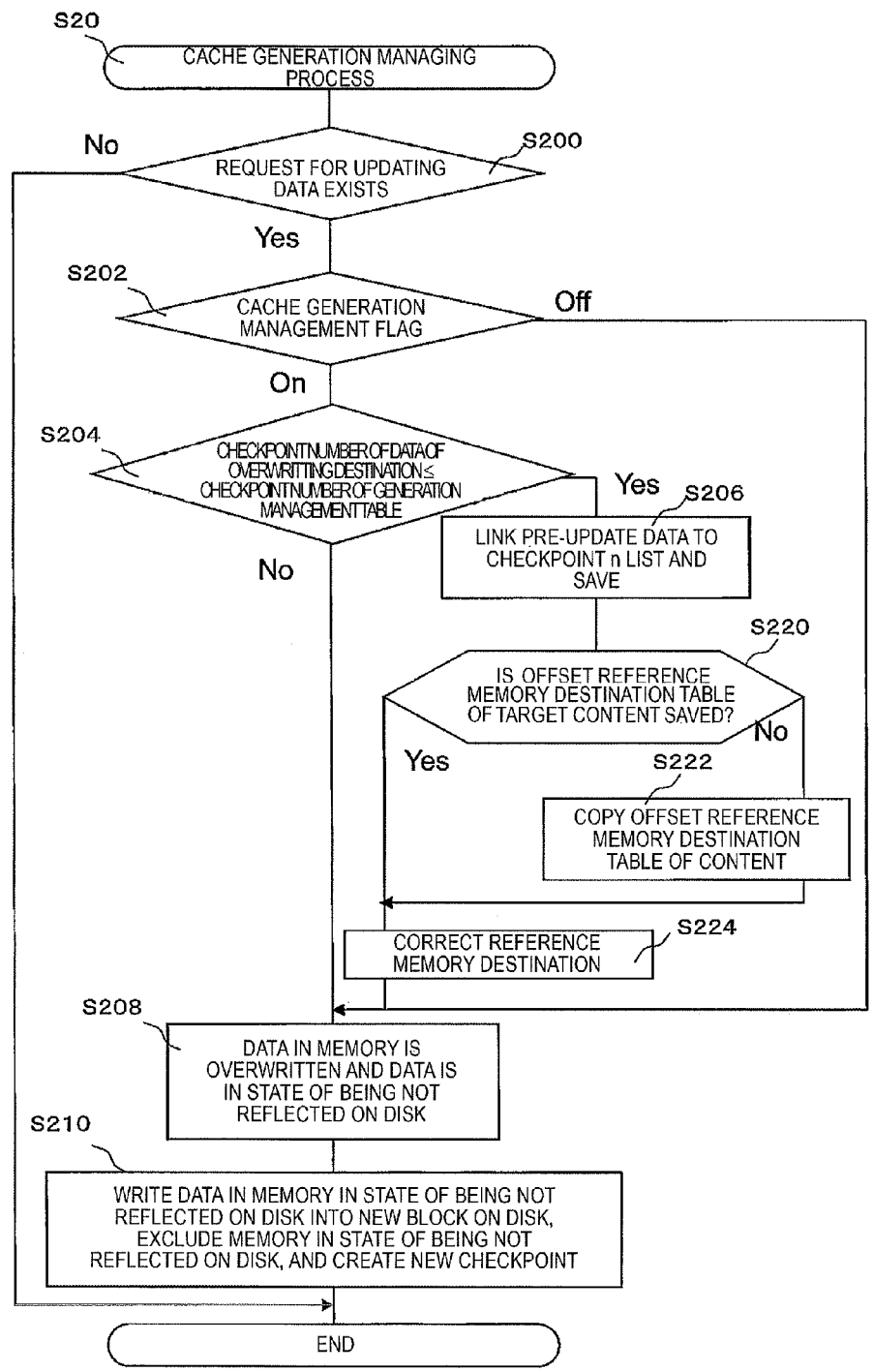
FIG. 13 is a flowchart of a cache generation managing process in the second embodiment.

FIG. 13 illustrates the process procedure of the cache generation managing process in the second embodiment. Steps which differ from those in the first embodiment are S220 to S224. After pre-update data is saved into the checkpoint n list 310 in S206, determination of whether the offset reference memory destination table of the target content is saved is performed (S220). When the table is not saved, a copy of the table is created in the save memory area (S222). This represents the offset reference memory destination table of the content at the checkpoint n. When the table is saved and after the process in S222 is performed, the reference memory destination is corrected by setting the reference memory destination that corresponds to the offset of the original table before being copied to a new memory area (S224). At this time, it is not necessary to correct the memory reference destination of the table saved into the copy destination. When the reference destination is the saved data, a flag may be added to the table, indicating the saved data when the flag is ON and data not saved when the flag is OFF.

Figure 14:
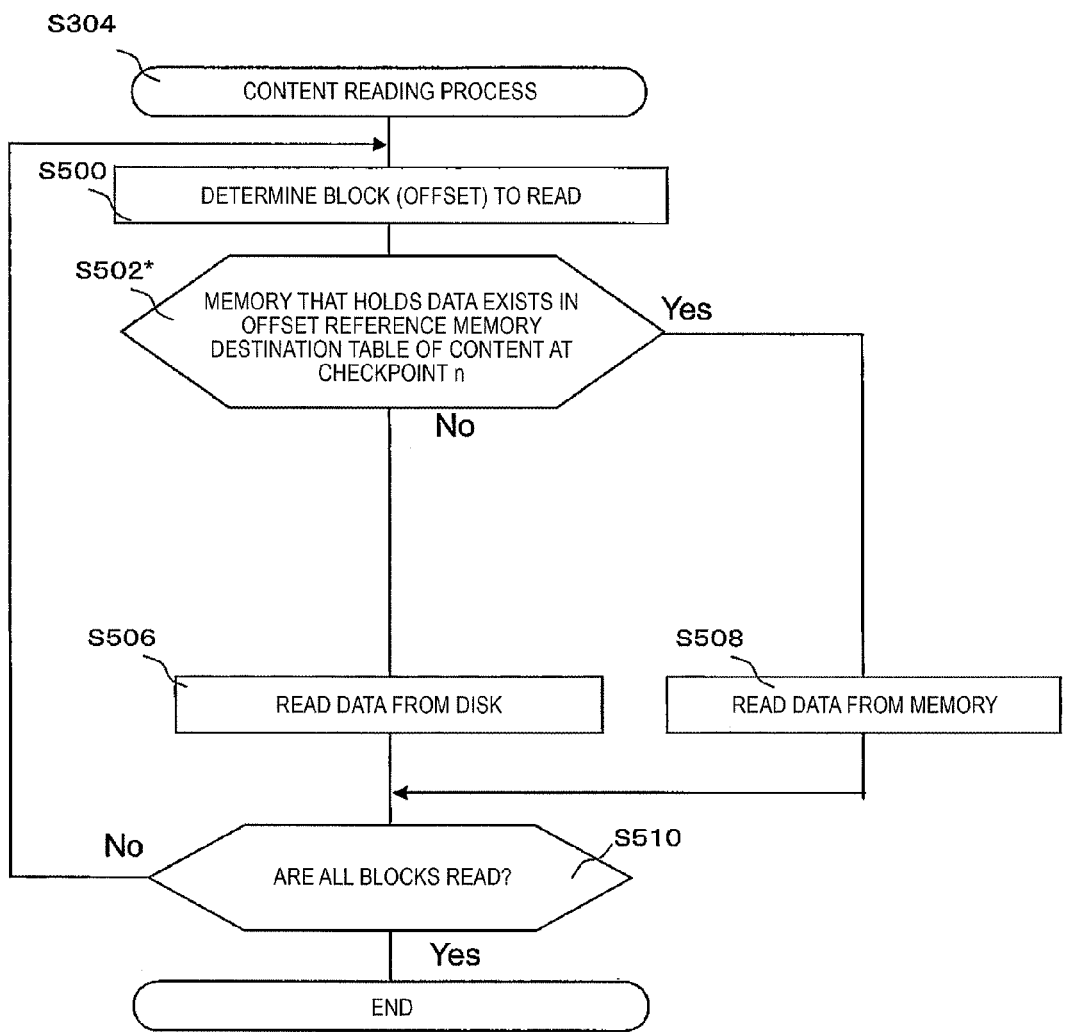
FIG. 14 is a flowchart of a content reading process in the second embodiment.

FIG. 14 illustrates the procedure of the content reading process in the second embodiment. S502* is different from S502 in the first embodiment. After an offset of the content is determined to be read (S500), determination of whether a memory that holds data exists at the reference destination for the offset of the offset reference memory destination table of the content at the checkpoint n is performed (S502*). When the memory exists, the data is read from the memory (S508). When the memory does not exist, the data is read from the disk (S506).

Figure 15:
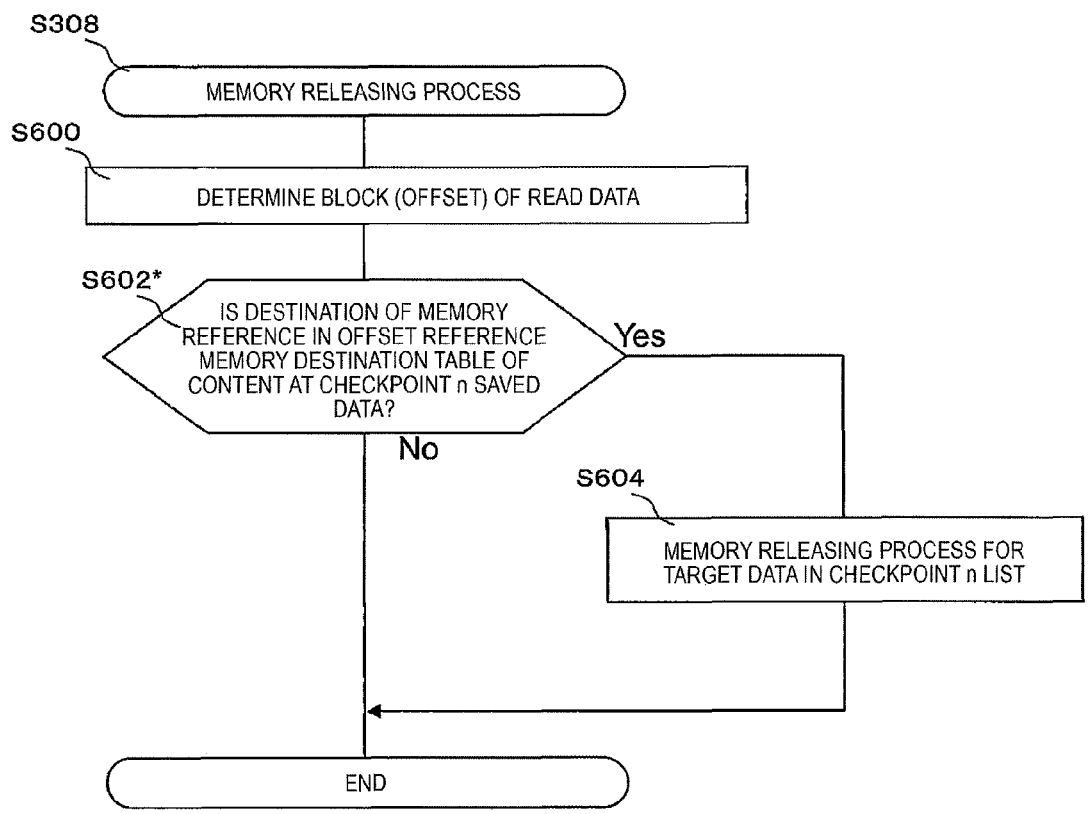
FIG. 15 is a flowchart of a memory releasing process in the second embodiment.

FIG. 15 illustrates the procedure of the memory releasing process in the second embodiment. S602* is different from S602 in the first embodiment. After the offset of the read data is determined (S600), determination of whether the reference destination for the offset of the offset reference memory destination table of the content at the checkpoint n is saved data is performed (S602*). When the reference destination is saved data, the memory releasing process (S604) is performed. The determination in S602* may be determination of whether the data at the reference destination exists in the checkpoint n list 310 or may be based on a flag when a flag is used for saved data in S224.

The present invention having the purpose of improving I/O performance from the host apparatus and in performance of the duplication process is described on the basis of the embodiments. The above embodiments are intended to facilitate understanding of the present invention and are not intended for interpretation of the present invention in a limited manner. The present invention can be modified or improved in a manner not departing from the gist of the invention and also includes the equivalents of the modification and the improvement.

REFERENCE SIGNS LIST

10: primary storage apparatus,
12: secondary storage apparatus,
14: host apparatus,
120: cache control program,
122: duplication program,
200: cache generation management table,
18: duplication server

The invention claimed is:

1. A storage apparatus that is connected to a host apparatus, the storage apparatus comprising:
a memory that includes a save memory area and a cache memory area which temporarily stores data received from the host apparatus;
a storage device that stores the data; and
a processor, wherein the processor:
controls a duplication process for specified data into an other storage apparatus at a point in time of a start of duplication,
increments a checkpoint number when data blocks are reflected from the memory to the storage device,
creates a first checkpoint list, wherein the checkpoint list includes a first list of data blocks and first checkpoint numbers that correspond to most recent data in the cache memory area,
creates a second checkpoint list, wherein the checkpoint list includes a second list of data blocks and second checkpoint numbers that correspond to when data was reflected to the save memory area,
saves, based on a comparison of the first checkpoint list and the second checkpoint list, a first data block into the save memory area when receiving an update request of the first data block in the cache memory area after the start of duplication,
updates the first data block in the cache memory area to an updated data block,
reads the first data block from the save memory area, and transmits the first data block to the other storage apparatus.

2. The storage apparatus according to claim 1, wherein the processor further:
determines whether the data block of a reading target in the specified data at the point in time of the start of duplication is updated after the start of the duplication process,
reads the data block of the reading target from the save memory area when the data block of the reading target is updated and reads the data block of the reading target from the cache memory area when the data block of the reading target is not updated, and
transmits the data block to the other storage apparatus.

3. The storage apparatus according to claim 2, wherein the processor further:
releases the data block where pre-update data block is stored in the save memory area when duplication of the pre-update data block stored in the save memory area to the other storage apparatus is completed.

4. The storage apparatus according to claim 1, wherein the processor further:
copies data of the first data block to the save memory area and updates the first data block to first updated data when receiving a first update request of the first data block that constitutes data at the point in time of start of duplication in the cache memory area to the first updated data, and
does not copy the first updated data to the save memory area and updates the first updated data to second updated data when receiving a second update request of the first updated data to the second updated data.

5. The storage apparatus according to claim 1, wherein the processor further:
determines whether to copy the data block to the save memory area by comparing the checkpoint number at the time of the start of the update with the checkpoint number that the data block is given when receiving the update request.

6. The storage apparatus according to claim 1, wherein the processor further:
performs the duplication process in units of a content, and
saves metadata that includes management information of the data block and the data block as well into the save memory area.

7. The storage apparatus according to claim 1, wherein the memory stores an offset reference memory destination table for managing a correspondence between a place where the data block is stored on the storage device and a location where the data block is stored in the memory, and
the processor further:
saves the offset reference memory destination table into the save memory area when receiving the update request of the first data block, and updates the location where the first data block in the offset reference memory destination table saved is stored on the memory to an area into which the offset reference memory destination table is saved in the save memory area.

8. A method for controlling a storage apparatus, the method comprising:
controlling a duplication process;
incrementing a checkpoint number when data blocks from a memory are reflected on to a storage device,
creating a first checkpoint list, wherein the checkpoint list includes a first list of data blocks and first checkpoint numbers that correspond to most recent data in a cache memory area,
creating a second checkpoint list, wherein the checkpoint list includes a second list of data blocks and second checkpoint numbers that correspond to when data was reflected to the memory,
saving, based on a comparison of the first checkpoint list and the second checkpoint list, a first data block into a save memory area when an update request of the first data block in the cache memory area is received during duplication;
updating the first data block in the cache memory area to an updated data block; and
reading the first data block from the save memory area and transmitting the first data block to an other storage apparatus.

9. The method according to claim 8, further comprising:
determining whether the data block of a reading target is updated after the duplication process is performed based on the checkpoint,
reading the data block of the reading target from the save memory area is performed when the data block of the reading target is updated and reading the data block of the reading target from the cache memory area is performed when the data block of the reading target is not updated, and
transmitting the data block to the other storage apparatus is performed.

10. The method according to claim 9, further comprising:
releasing the block where pre-update data block is stored in the save memory area is performed when duplication of the pre-update data block stored in the save memory area to the other storage apparatus is completed.

11. The method according to claim 8, further comprising:
copying data of the first data block to the save memory area and updating the first data block to first updated data are performed when a first update request of the first data block that constitutes data at a point in time of start of duplication in the cache memory area to the first updated data is received, and
copying the first updated data to the save memory area is not performed and updating the first updated data to second updated data is performed when a second update request of the first updated data to the second updated data is received.

12. The method according to claim 8, further comprising:
determining whether to copy the data block to the save memory area is performed by comparing the checkpoint number at a start time of the update with the checkpoint number that the data block is given when the update request is received.

13. The method according to claim 8, further comprising:
storing an offset reference memory destination table for managing a correspondence between a place where the data block stored on the storage device and a location where the data block is stored in the memory,
the offset reference memory destination table is saved into the save memory area when the update request of the first data block is received, and
the location where the first data block in the offset reference memory destination table that is saved is stored on the memory is updated to an area into which the offset reference memory destination table is saved in the save memory area.

* * * * *